US012412521B2

(12) United States Patent
Lin et al.

(10) Patent No.: US 12,412,521 B2
(45) Date of Patent: Sep. 9, 2025

(54) DISPLAY DEVICE

(71) Applicant: AUO Corporation, Hsin-Chu (TW)

(72) Inventors: Sing-Ru Lin, Hsin-Chu (TW); Yi-Chien Chen, Hsin-Chu (TW); Hui-Yuan Wang, Hsin-Chu (TW); Yow-Shiuan Jeng, Hsin-Chu (TW); Yung-Hsiang Lan, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/772,360

(22) Filed: Jul. 15, 2024

(65) Prior Publication Data

US 2025/0061842 A1 Feb. 20, 2025

(30) Foreign Application Priority Data

Aug. 17, 2023 (TW) ................................ 112130998

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/0267* (2013.01); *G09G 2310/0286* (2013.01); *G09G 2310/08* (2013.01)

(58) Field of Classification Search
CPC ............. G09G 3/32; G09G 2300/0861; G09G 2310/0267; G09G 2310/0286; G09G 2300/0819; G09G 2300/0842; G09G 3/3233; G09G 3/3266; G09G 2310/08; G09G 3/3677; G09G 2310/0278
See application file for complete search history.

(56) References Cited

U.S. PATENT DOCUMENTS

| | | | | |
|---|---|---|---|---|
| 10,998,069 | B2 | 5/2021 | Chien et al. | |
| 2018/0182303 | A1 | 6/2018 | Jung et al. | |
| 2020/0403051 | A1 | 12/2020 | Han et al. | |
| 2021/0065632 | A1* | 3/2021 | Kim | G11C 19/28 |
| 2022/0101777 | A1* | 3/2022 | Kim | G09G 3/3233 |
| 2023/0326383 | A1* | 10/2023 | Zhang | G09G 3/20 |
| 2024/0021165 | A1* | 1/2024 | Kang | G09G 3/3266 |

* cited by examiner

*Primary Examiner* — Muhammad N Edun
(74) *Attorney, Agent, or Firm* — WPAT, PC

(57) ABSTRACT

A display device includes a pixel circuit and a stage of a scan driver. The stage of the scan driver is electrically coupled to the pixel circuit. The stage of the scan driver is configured to output a first scan signal and a second scan signal to the pixel circuit. A first enable voltage of the first scan signal is at a first logic level, and a first disable voltage of the first scan signal is at a second logic level. A second enable voltage of the second scan signal is at the second logic level.

18 Claims, 7 Drawing Sheets

110(n)

DISPLAY DEVICE

CROSS-REFERENCE TO RELATED APPLICATION

This application claims priority to Taiwan Application Serial Number 112130998, filed Aug. 17, 2023, which is herein incorporated by reference in its entirety.

BACKGROUND

Field of Invention

The present invention relates to a display device. More particularly, the present invention relates to a display device including pixel circuits.

Description of Related Art

Nowadays, the narrow bezel and the high quality image are eagerly pursued in display techniques. In some cases, if the voltage maintained by the storage capacitor included in the pixel circuit is decreased due to the leakage in transistor, it may reduce the image quality. Therefore, how to improve the above problems and the increase in overall circuit area, in order to provide the narrow bezel display, are the important issues in this filed.

SUMMARY

The present disclosure provides a display device. The display device includes a pixel circuit and a stage of a scan driver. The stage of the scan driver is electrically coupled to the pixel circuit. The stage of a scan driver is configured to output a first scan signal and a second scan signal to the pixel circuit. A first enable voltage of the first scan signal is at a first logic level. A first disable voltage of the first scan signal is at a second logic level. A second enable voltage of the second scan signal is at the second logic level.

The present disclosure provides a display device. The display device includes a pixel circuit and a stage of a scan driver. The pixel circuit includes a P-type transistor and a N-type transistor. The stage of the scan driver is electrically coupled to the pixel circuit. The stage of the scan driver is configured to perform the following steps. A first scan signal is output to a gate terminal of the P-type transistor. A second scan signal is output to a gate terminal of the N-type transistor. A first enable voltage of the first scan signal is at a first logic level. A first disable voltage of the first scan signal is at a second logic level. A second enable voltage of the second scan signal is at the second logic level.

Summary, the stage of the scan driver outputs two scan signals having different enable voltages to the pixel circuit, in order to control the operation of the pixel circuit.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
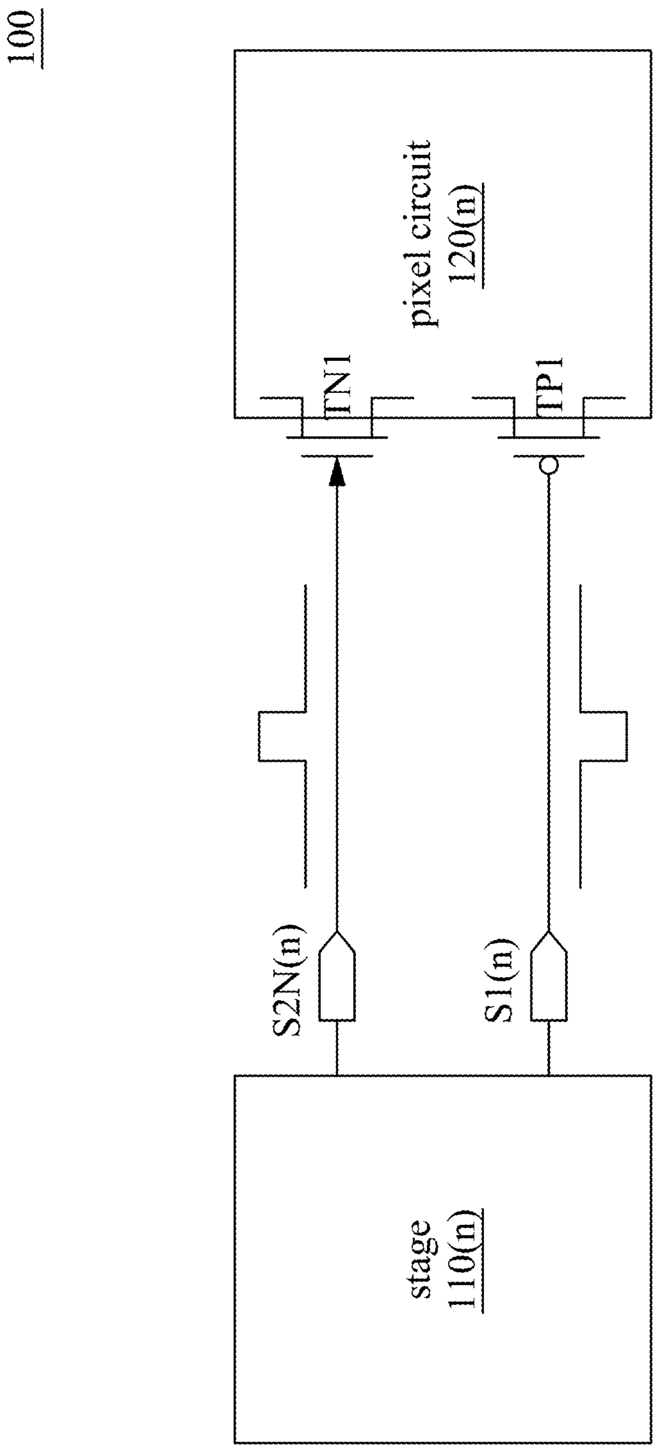
FIG. 1 depicts a schematic diagram of a display device according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms “comprise” or “comprising,” “include” or “including,” “have” or “having,” “contain” or “containing” and the like used herein are to be understood to be open-ended, i.e., to mean including but not limited to.

A description is provided with reference to FIG. 1. FIG. 1 depicts a schematic diagram of a display device 100 according to some embodiments of the present disclosure. In some embodiments, the display device 100 includes a scan driver which includes multiple stages and a pixel array which includes multiple pixel circuits. As shown in FIG. 1, the display device 100 includes a stage 110(*n*) of the scan driver and a pixel circuit 120(*n*). In some embodiments, the stage 110(*n*) of the scan driver refers to n-th stage of the scan driver which can be considered as gate driving circuits, and the stage 110(*n*) of the scan driver is configured to provide a scan signal S1(*n*) and a scan signal S2N(n) to the pixel circuit 120(*n*). In some embodiments, the pixel circuit 120(*n*) refers to a pixel circuit arranged in n-th pixel line of the pixel array included in the display device 100. In some embodiments, the pixel circuit 120(*n*) includes a P-type transistor TP1 and a N-type transistor TN1. In some embodiments, the stage 110(*n*) of the scan driver generates and outputs the scan signal S1(*n*) to the P-type transistor TP1. In some embodiments, an enable voltage of the scan signal S1(*n*) is at a first logic level (such as, a low logic level), and a disable voltage of the scan signal S1(*n*) is at a second logic level (such as, a high logic level).

In some embodiments, the stage 110(*n*) of the scan driver generates and outputs the scan signal S2N(n) to the N-type transistor TN1. In some embodiments, an enable voltage of the scan signal S2N(n) is at a high logic level, and a disable voltage of the scan signal S2N(n) is at a low logic level. In some embodiments, since the N-type transistor TN1 has the characteristics of low leakage current, the configuration of the N-type transistor TN1 can reduce the leakage current in the pixel circuit 120(*n*), in order to improve the image quality.

Figure 2:
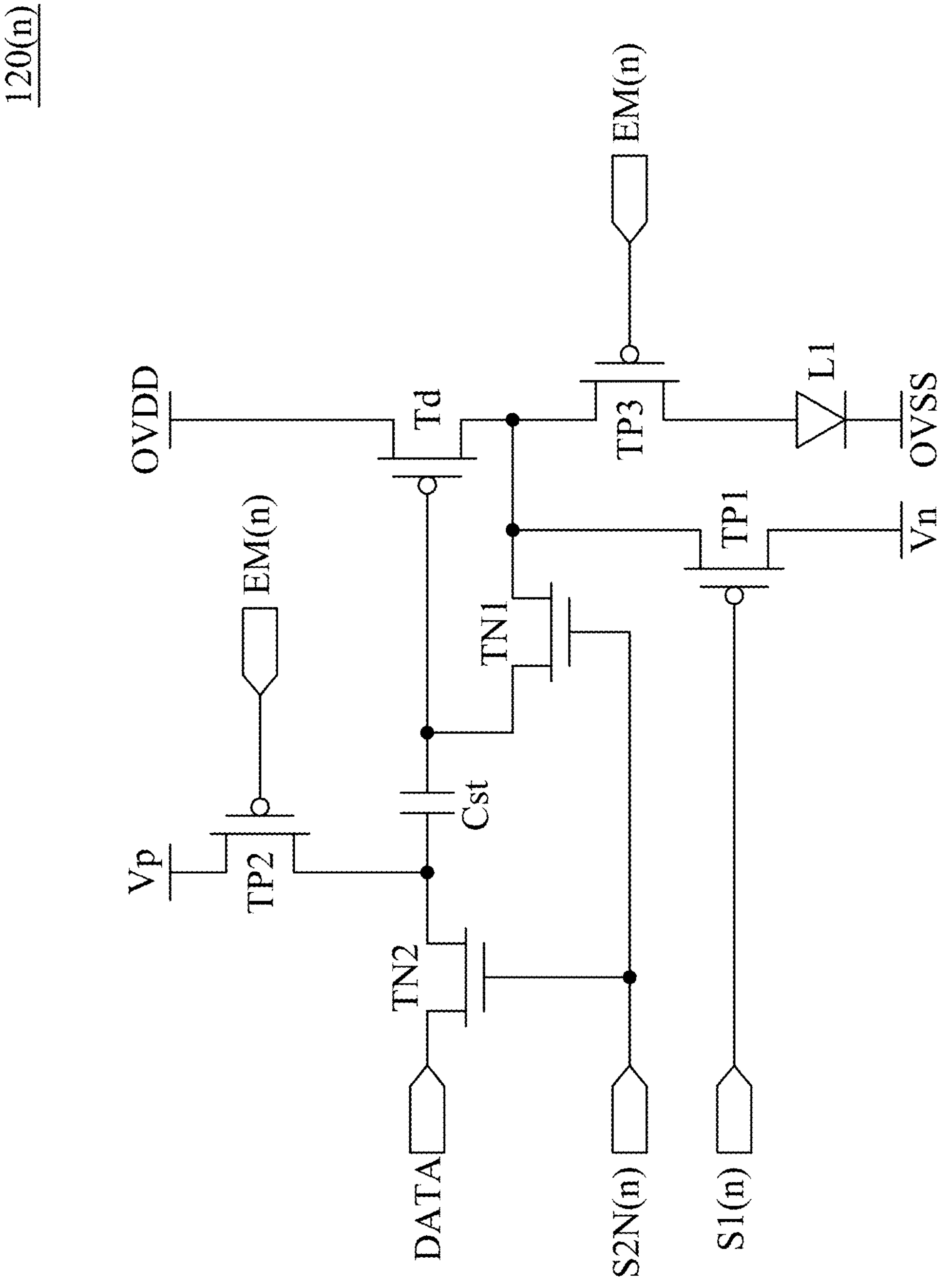
FIG. 2 depicts a schematic diagram of a pixel circuit according to some embodiments of the present disclosure.

A description is provided with reference to FIG. 2. FIG. 2 depicts a schematic diagram of a pixel circuit 120(*n*) according to some embodiments of the present disclosure. As shown in FIG. 2, the pixel circuit 120(*n*) includes N-type transistors TN1~TN2, P-type transistors TP1~TP3, a driving transistor Td, a storage capacitor Cst and a light emitting element L1. In some embodiments, the light emitting element L1 is a micro light emitting diode. The each of the aforesaid transistor has a first terminal, a second terminal and a gate terminal (gate). If a first terminal of a transistor is a drain/source terminal, a second terminal of the transistor is a source/drain terminal. And, the aforesaid capacitor has a first terminal and a second terminal. If a first terminal of a capacitor is an anode/cathode, a second of the capacitor is a cathode/anode.

In some embodiments, a first terminal of the N-type transistor TN1 is electrically coupled to a gate terminal of the driving transistor Td and a second terminal of the storage capacitor Cst, and a second terminal of the N-type transistor TN1 is electrically coupled to a second terminal of the driving transistor Td, and a second terminal of the N-type transistor TN1 is electrically coupled to a second terminal of the driving transistor Td. In some embodiments, a gate terminal of the N-type transistor TN1 is configured to receive a scan signal S2N(n), and the N-type transistor TN1 is turned on according to the scan signal S2N(n). In some embodiments, the N-type transistor TN1 connected between the gate terminal and the second terminal of the driving transistor Td is to compensate a threshold voltage of the driving transistor Td. In some embodiments, the N-type transistor TN1 connected between the gate terminal of the driving transistor Td and the first reference voltage terminal Vn is to reset the voltage at the gate terminal of the driving transistor Td. In some embodiments, since the N-type transistor TN1 has the characteristics of low leakage current, when the N-type transistor TN1 is turned off, it can avoid the decreasing of the voltage maintained by the storage capacitor Cst, as such the quality of display image can be improved.

In some embodiments, a first terminal of the P-type transistor TP1 is electrically coupled to the second terminal of the N-type transistor TN1, and a second terminal of the P-type transistor TP1 is electrically coupled to the first reference voltage terminal Vn. In some embodiments, a gate terminal of the P-type transistor TP1 is configured to receive a scan signal S1(*n*), and the P-type transistor TP1 is turned on according to the scan signal S1(*n*). In some embodiments, the P-type transistor TP1 connected between the second terminal of the N-type transistor TN1 and the first reference voltage terminal Vn is configured to reset the voltage at the gate terminal of the driving transistor Td via the N-type transistor TN1.

In some embodiments, a first terminal of the N-type transistor TN2 is configured to receive a data signal DATA, a second terminal of the N-type transistor TN2 is electrically coupled to a first terminal of the storage capacitor Cst. In some embodiments, a gate terminal of the N-type transistor TN2 is configured to receive the scan signal S2N(n). In some embodiments, the data signal DATA is provided by a source driver (not shown). In some embodiments, both of the N-type transistors TN2 and TN1 are controlled by the scan signal S2N(n), as such the number of the scan signals, transmission lines and the area of the circuit for generating additional scan signals can be reduced.

In some embodiments, a first terminal of the P-type transistor TP2 is electrically coupled to the second reference voltage terminal Vp, and a second terminal of the P-type transistor TP2 is electrically coupled to a second terminal of the N-type transistor TN2. A gate terminal of the P-type transistor TP2 is configured to receive an emission control signal EM(n). In some embodiments, a voltage of the second reference voltage terminal Vp is higher than a voltage of the first reference voltage terminal Vn. In some embodiments, the emission control signal EM(n) is provided by a n-th stage of a emission driver (not shown).

In some embodiments, a first terminal of the P-type transistor TP3 is electrically coupled to the second terminal of the driving transistor Td, and a second terminal of the P-type transistor TP3 is electrically coupled to a first terminal of the light emitting element L1. A gate terminal of the P-type transistor TP2 is configured to receive the emission control signal EM(n). In some embodiments, a voltage of the second reference voltage terminal Vp is higher than a voltage of the first reference voltage terminal Vn.

In some embodiments, a first terminal of the driving transistor Td is electrically coupled to the first system voltage terminal OVDD, and a second terminal of the driving transistor Td is electrically coupled to the first terminal of the P-type transistor TP3. A gate terminal of the driving transistor Td is electrically coupled to the second terminal of the storage capacitor Cst. In some embodiments, the driving transistor Td and the light emitting element L1 are connected between a first system voltage terminal OVDD and a second system voltage terminal OVSS, as such the driving transistor Td controls an amplitude of the driving current flowing through the light emitting element L1 according to a voltage at the gate terminal of the driving transistor Td, in order to control the light intensity of the light emitting element L1.

In some embodiments, a first terminal of the light emitting element L1 is electrically coupled to a second terminal of the P-type transistor TP3, and a second terminal of the light emitting element L1 is electrically coupled to the second system voltage terminal OVSS. In some embodiments, the light emitting element L1 emits light according to the driving current controlled/provided by the driving transistor Td.

Figure 3:
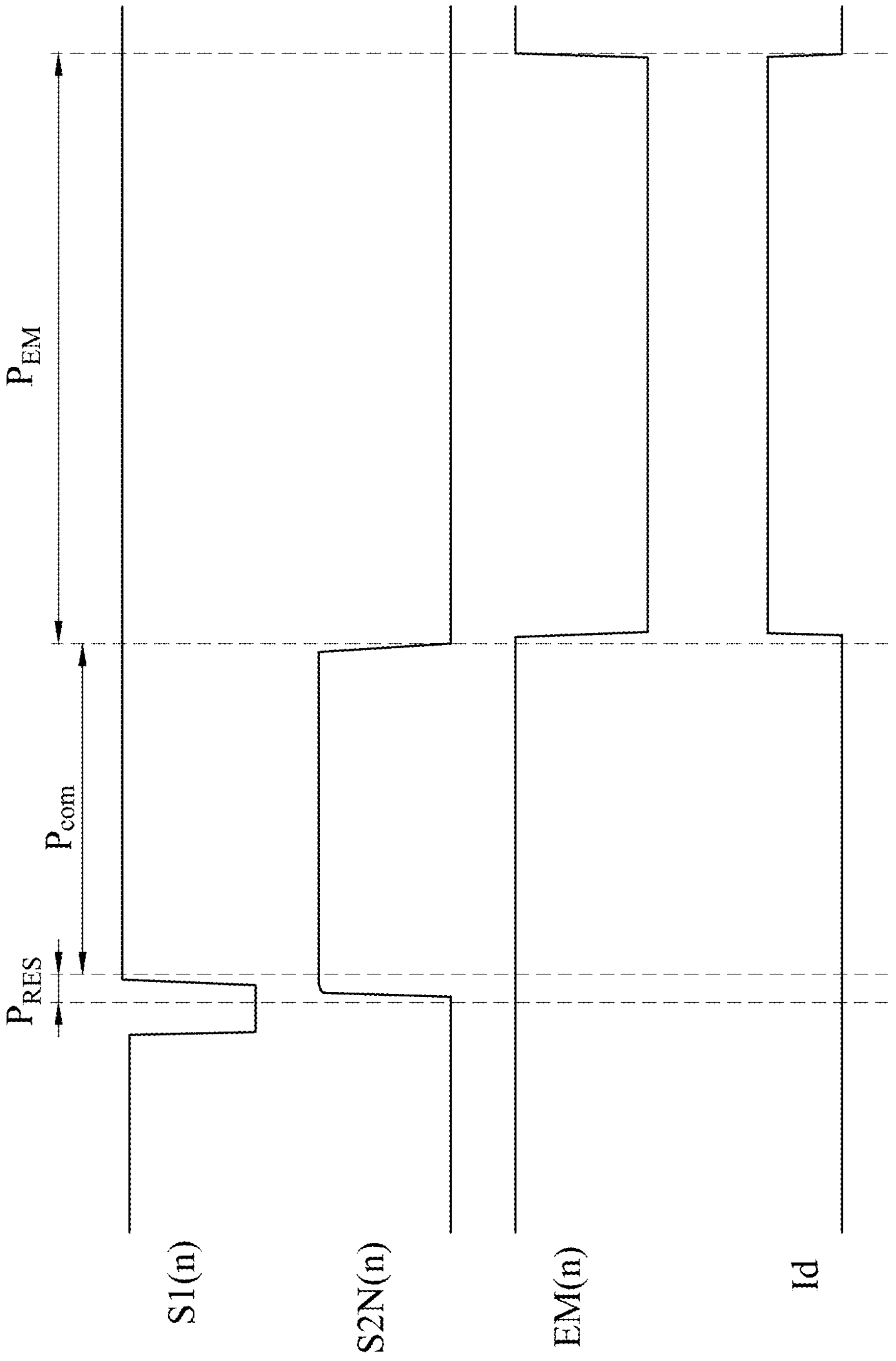
FIG. 3 depicts a timing diagram of scan signals, an emission control signal and a driving current for the pixel circuit in FIG. 2 according to some embodiments of the present disclosure.

To make the overall operation of the pixel circuit 120(*n*) more clear and understandable, the following description is provided with reference to FIG. 2 and FIG. 3. FIG. 3 depicts a timing diagram of scan signals S1(*n*) and S2N(n), an emission control signal EM(n) and a driving current Id for the pixel circuit 120(*n*) in FIG. 2 according to some embodiments of the present disclosure. As shown in FIG. 2, one display period in the control timing of the pixel circuit 120(*n*) can be divided into three periods, which are a reset period $P_{RES}$, a compensation period $P_{COM}$, and an emission period $P_{EM}$. To be noted that, the periods as shown in FIG. 2 are for illustration, which are not intended to limit the present disclosure.

In the reset period $P_{RES}$, the scan signals S1(*n*) and S2N(n) have enable voltages, where the enable voltage of the scan signal S1(*n*) is at the first logic level (such as, the low logic level), and the enable voltage of the scan signal S2N(n) is at the second logic level (such as, the high logic level). On the other hand, the emission control signal EM(n) has a disable voltage, the disable voltage is at the high logic level.

In the compensation period $P_{COM}$, the scan signal S2N(n) has an enable voltage. On the other hand, the scan signal S1(*n*) and the emission control signal EM(n) have disable voltages, where the disable voltage of the scan signal S1(*n*) is at the second logic level (such as, the high logic level).

In the emission period $P_{EM}$, the emission control signal EM(n) has an enable voltage, where the enable voltage of the emission control signal EM(n) is at the first logic level (such as, the low logic level). On the other hand, the scan signals S1(*n*) and S2N(n) have the disable voltages, where the disable voltage of the scan signal S2N(n) is at the first logic level (such as, the low logic level).

In the reset period $P_{RES}$, since the scan signals S1(*n*) and S2N(n) have enable voltages, the P-type transistor TP1 and the N-type transistors TN1 and TN2 are turned on. On the other hand, since the emission control signal EM(n) has a disable voltage, the P-type transistors TP2 and TP3 are turned off.

Specifically, in the reset period $P_{RES}$, when the data signal DATA is transmitted through the N-type transistor TN2 to the first terminal of the storage capacitor Cst, the voltage of the first reference voltage terminal Vn is transmitted through the P-type transistor TP1 and the N-type transistor TN1 to the gate terminal of the driving transistor Td, in order to turn on the driving transistor Td and perform the reset operation.

In the compensation period $P_{COM}$, since the scan signal S2N(n) has the enable voltage, the N-type transistors TN1 and TN2 are turned on. On the hand, since the scan signal S1(*n*) and the emission control signal EM(n) have the disable voltages, the P-type transistors TP1, TP2 and TP3 are turned off.

Specifically, in the compensation period $P_{COM}$, when the data signal DATA is transmitted though the N-type transistor TN2 to the first terminal of the storage capacitor Cst, the voltage of the first system voltage terminal OVDD is transmitted through the driving transistor Td and the N-type transistor TN1 to the gate terminal of the driving transistor Td, until the driving transistor Td is cut-off, as such the voltage at the second terminal of the storage capacitor Cst includes the information of the threshold voltage of the driving transistor Td, in order to perform the operation for compensating the threshold voltage of the driving transistor Td.

In the emission period $P_{EM}$, since the emission control signal EM(n) has the enable voltage, the P-type transistors TP2 and TP3 are turned on. On the other hand, since the scan signals S1(*n*) and S2N(n) have the disable voltages, the N-type transistors TN1 and TN2 and the P-type transistor TP1 are turned off.

Specifically, at the beginning of the emission period $P_{EM}$, the voltage of the second reference voltage terminal Vp is transmitted through the P-type transistor TP2 to the first terminal of the storage capacitor Cst. Meanwhile, the voltage at the first terminal of the storage capacitor Cst is varied from a voltage of the data signal DATA transmitted in the compensation period $P_{COM}$ to a voltage of the second reference voltage terminal Vp, this voltage variation is transferred though the storage capacitor Cst to the second terminal of the storage capacitor Cst by capacitive coupling, as such the voltage at the second terminal of the storage capacitor Cst includes the information of the voltage of the data signal DATA and the threshold voltage of the driving transistor Td. As a result, in the emission period $P_{EM}$, the driving current Id flows from the first system voltage terminal OVDD through the driving transistor Td, the P-type transistor TP3 and the light emitting element L1 to the second system voltage terminal OVSS. In some embodiments, the driving transistor Td controls the pulse amplitude of the driving current Id flowing through the light emitting element L1 according to the voltage at the gate terminal of the driving transistor Td (or the voltage at the second terminal of the storage capacitor Cst), in order to control the light intensity of the light emitting element L1.

Figure 4:
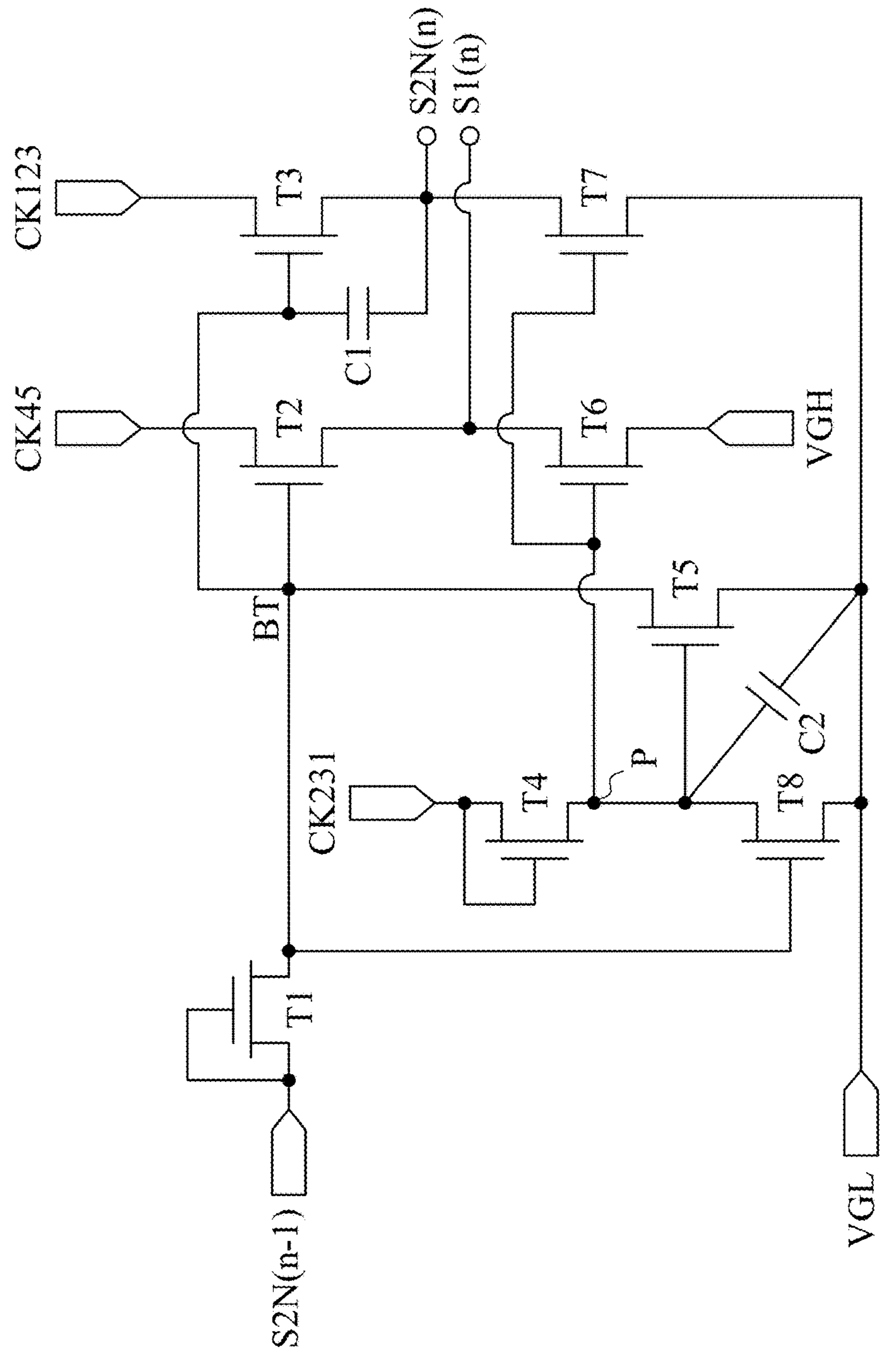
FIG. 4 depicts a schematic diagram of a stage of a scan driver according to some embodiments of the present disclosure.

A description is provided with reference to FIG. 4. FIG. 4 depicts a schematic diagram of a stage 110(*n*) of a scan driver according to some embodiments of the present disclosure. As shown in FIG. 4, the stage 110(*n*) of the scan driver includes transistors T1~T8 and capacitors C1~C2.

In some embodiments, a first terminal and a gate terminal of the transistor T1 is configured to receive a previous scan signal S2N(n−1), and a second terminal of the transistor T1 is electrically coupled to the operating node BT. In some embodiments, the stage 110(*n*) of the scan driver can be considered as a current stage of the scan driver, and the stage 110(*n*) of the scan driver receives the previous scan signal S2N(n−1) output by a previous stage of the scan driver. In some embodiments, the enable voltages of the previous scan signal S2N(n−1) and the scan signal S2N(n) are at the second logic level (such as, the high logic level). In some embodiments, a first terminal of the transistor T2 is configured to receive a first clock signal CK45, and a second terminal of the transistor T2 is configured to output the first scan signal S1(*n*). A gate terminal of the transistor T2 is electrically coupled to the operating node BT. In some embodiments, a first terminal of the transistor T3 is configured to receive a second clock signal CK123, and a second terminal of transistor T3 is configured to output a second scan signal S2N(n). A gate terminal of the transistor T3 is electrically coupled to the operating node BT. In some embodiments, a first terminal of the capacitor C1 is electrically coupled to the operating node BT, and a second terminal of the capacitor C1 is electrically coupled to a second terminal of the transistor T3.

In some embodiments, a first terminal and a gate terminal of the transistor T4 is configured to receive a third clock signal CK231, a second terminal of the transistor T4 is electrically coupled to the voltage stabilizing node P. In some embodiments, a first terminal of the transistor T5 is electrically coupled to the operating node BT, and a second terminal of the transistor T5 is electrically coupled to the system low voltage terminal VGL. A gate terminal of the transistor T5 is electrically coupled to the voltage stabilizing node P. In some embodiments, a first terminal of the transistor T6 is electrically coupled to the second terminal of the transistor T2, and a second terminal of the transistor T6 is electrically coupled to the system high voltage terminal VGH. A gate terminal of the transistor T6 is electrically coupled to the voltage stabilizing node P. In some embodiments, a first terminal of the transistor T7 is electrically coupled to a second terminal of the transistor T3, and a second terminal of the transistor T7 is electrically coupled to the system low voltage terminal VGL. A gate terminal of the transistor T7 is electrically coupled to the voltage stabilizing node P.

In some embodiments, a first terminal of the transistor T8 is electrically coupled to the voltage stabilizing node P, and a second terminal of the transistor T8 is electrically coupled to the system low voltage terminal VGL. A gate terminal of the transistor T8 is electrically coupled to the operating node BT. In some embodiments, a first terminal of the capacitor C2 is electrically coupled to the voltage stabilizing node P, and a second terminal of the capacitor C2 is electrically coupled to the system low voltage terminal VGL.

Figure 5:
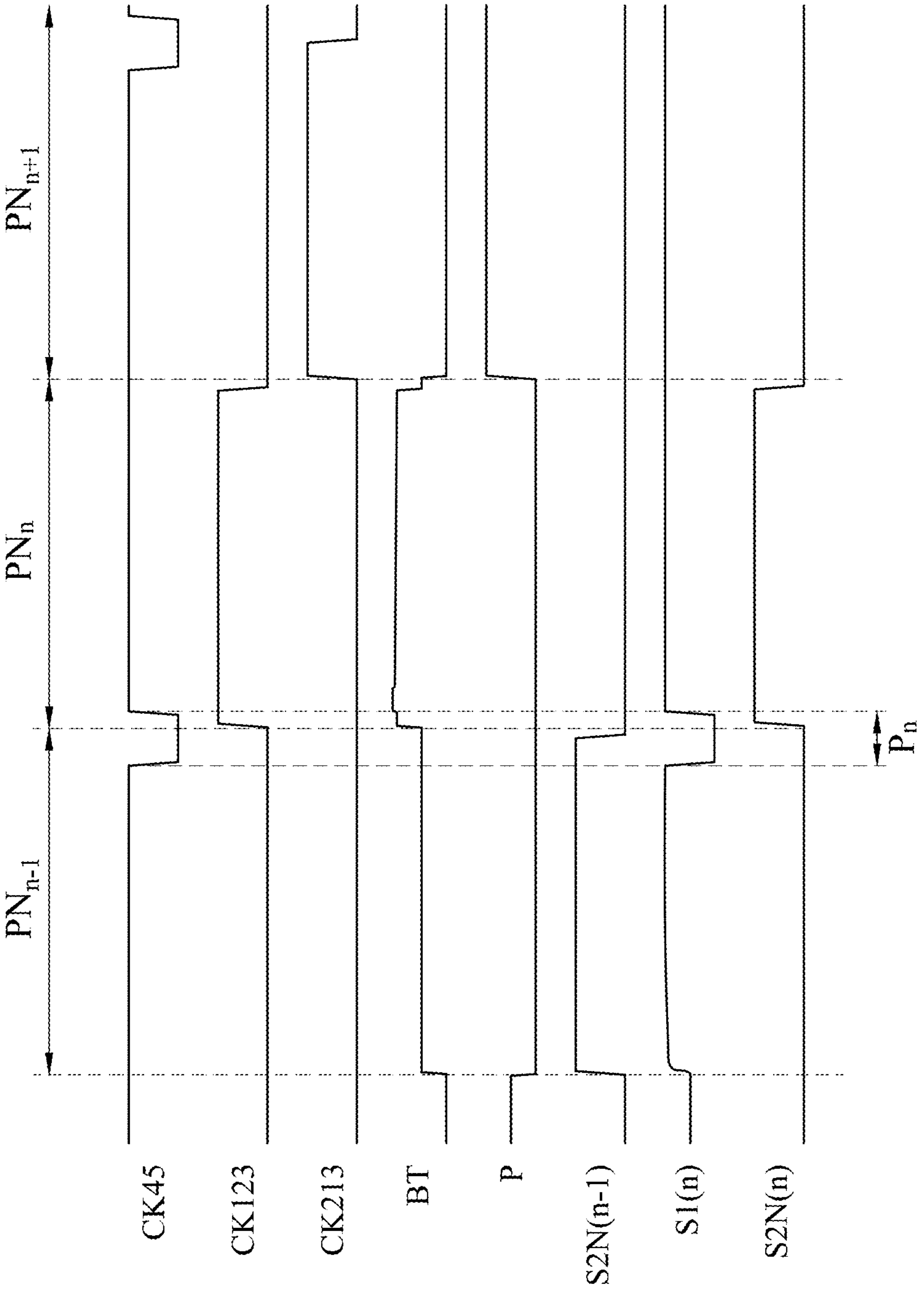
FIG. 5 depicts a timing diagram of clocks signals, voltage at nodes and scan signals for the stage of the scan driver in FIG. 4 according to some embodiments of the present disclosure.

A description is provided with reference to FIG. 4 and FIG. 5. FIG. 5 depicts a timing diagram of a first clock signal CK45, a second clock signal CK123, a third clock signal CK231, voltage at the operating node BT and the voltage stabilizing node P, previous scan signal S2N(n−1) and scan signals S2N(n) and S1(*n*). In some embodiments, the period $PN_{n-1}$, $PN_n$ and $PN_{n+1}$ respectively refer to the periods that the previous scan signal S2N(n−1), the scan signal S2N(n) output by the current stage 110(*n*) of the scan driver and a post scan signal output by a post stage of the scan driver are at the enable voltages. In some embodiments, the period $P_n$ refers to a periods that the scan signal S1(*n*) has an enable level.

As shown in FIG. 5, in the period $PN_{n-1}$, when the transistor T1 is turned on according to the previous scan signal S2N(n−1), and the previous scan signal S2N(n−1) is transmitted to the operating node BT, the transistor T2 is turned on to output the first clock signal CK45 as the scan signal S1(*n*), and the transistor T3 is turned on to output the second clock signal CK123 as the scan signal S2N(n). To be noted that, when the transistor T3 is turned that, the rising edge of the second clock signal CK123 further increases the voltage at the operating node BT by the capacitive coupling effect of the capacitor C1, as such the conduction level of the transistor T3 can be increased.

In the period $PN_n$, the transistor T3 is turned on according to the voltage at the operating node BT, as such the scan signal S2N(n) is maintained at the enable voltage. And, in this period, the transistor T8 is turned on according to the voltage at the operating node BT, in order to pull down the potential at the voltage stabilizing node P to the potential of the system low voltage terminal VGL.

In the period $PN_{n+1}$, when the transistor T4 is turned on according to the third clock signal CK231, and the third clock signal CK231 is transmitted to the voltage stabilizing node P, the transistor T5 is turned on to pull down the potential at the operating node BT to the potential of the system low voltage terminal VGL, in order to turn off the transistors T2 and T3. The transistor T6 is turned on to transmit the voltage of the system high voltage terminal VGH to the second terminal of the transistor T2, and the transistor T7 is turned on to transmit the voltage of the system low voltage terminal VG to the second terminal of the transistor T3, in order to perform the voltage stabling operation.

Figure 6:
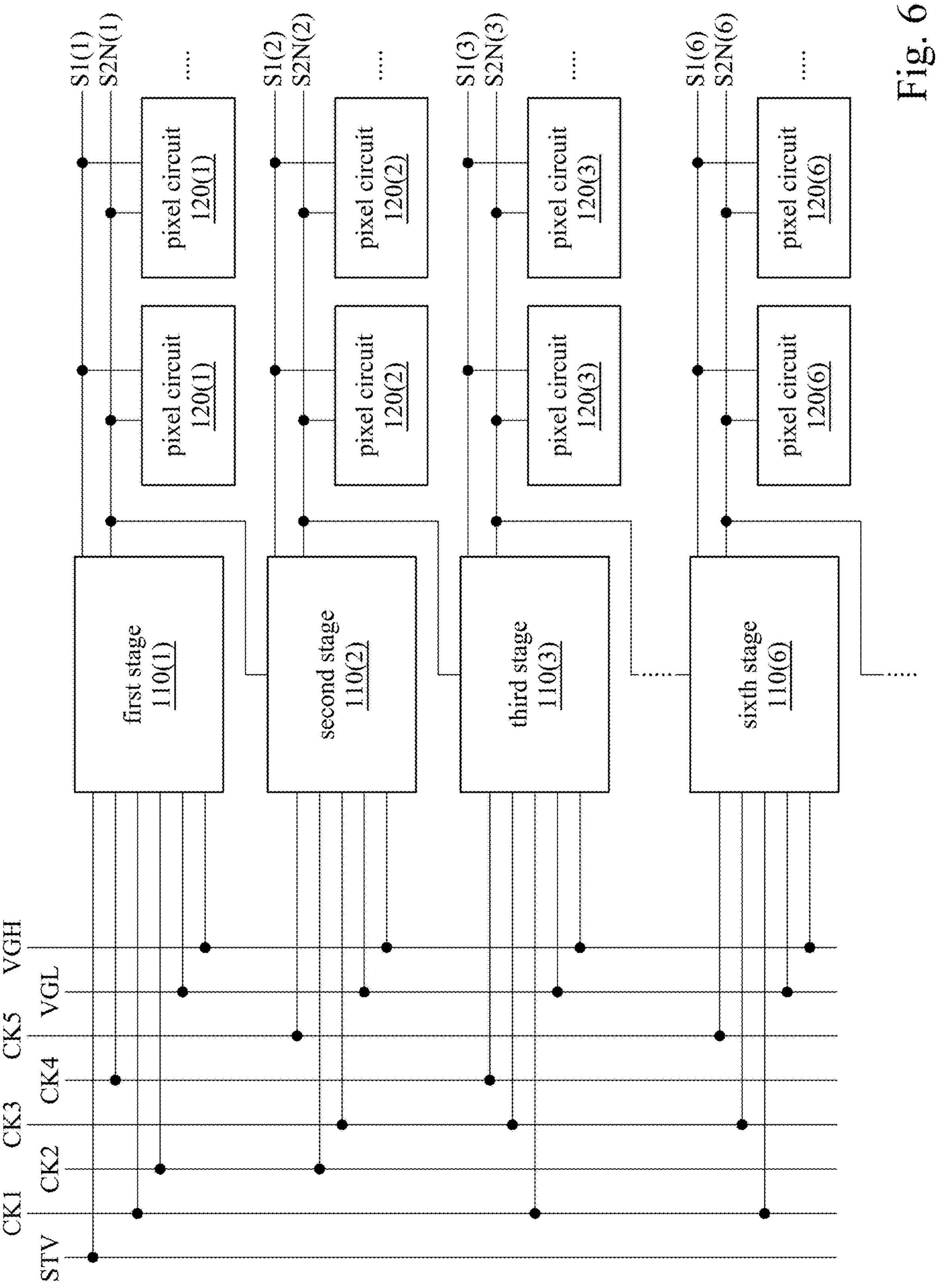
FIG. 6 depicts a schematic diagram of a display device according to some embodiments of the present disclosure.
Figure 7:
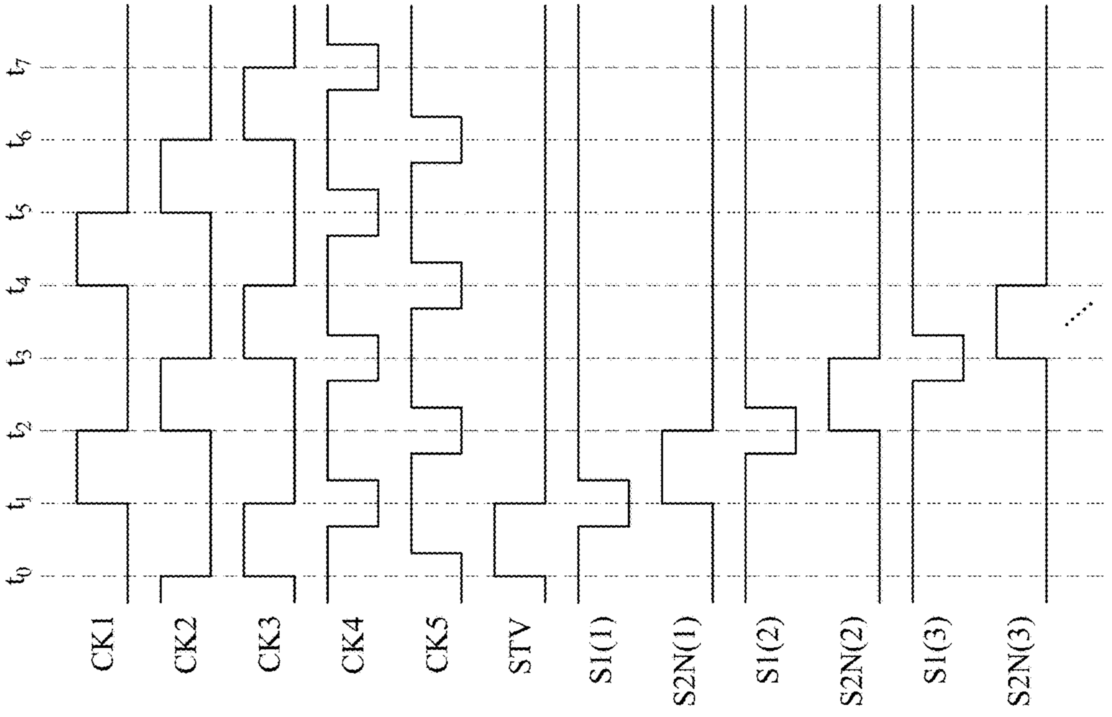
FIG. 7 depicts a timing diagram of clock signals, a start signal, and scan signals of the display device in FIG. 6 according to some embodiments of the present disclosure.

A description is provided with reference to FIG. 4, FIG. 6 and FIG. 7. FIG. 6 depicts a schematic diagram of a display device 100 according to some embodiments of the present disclosure. FIG. 7 depicts a timing diagram of clock signals CK1~CK5, a start signal STV, and scan signals S1(1)~S1(3) and S1(6) of the display device 100 in FIG. 6 according to some embodiments of the present disclosure. In some embodiments, a time interval between two adjacent of the time point $t_0$~$t_7$ in FIG. 7 is a horizontal scanning period.

In some embodiments, the display device 100 includes multiple stages of the scan driver, and there is a configuration for applying the clock signals to the pins of the said multiple stages of the scan driver, and the configuration for applying the clock signals is repeated with every 6 stages of the scan driver. Specifically, if the positive integer "n" about the n-th stage 110(*n*) of the scan driver is divided by 6 and leaves a remainder of 1 (such as, the first stage 110(1) of the scan driver), the first clock signal CK45 applied to the stage 110(*n*) of the scan driver is implemented by a clock signal CK4. The second clock signal CK123 applied to the stage 110(*n*) of the scan driver is implemented by a clock signal CK1, and the third clock signal CK231 applied to the stage 110(*n*) of the scan driver is implemented by a clock signal CK2.

If the positive integer "n" about the n-th stage 110(*n*) of the scan driver is divided by 6 and leaves a remainder of 2 (such as, the second stage 110(2) of the scan driver), the first clock signal CK45 applied to the stage 110(*n*) of the scan driver is implemented by a clock signal CK5. The second clock signal CK123 applied to the stage 110(*n*) of the scan driver is implemented by a clock signal CK2, and the third clock signal CK231 applied to the stage 110(*n*) of the scan driver is implemented by a clock signal CK3.

If the positive integer "n" about the n-th stage 110(*n*) of the scan driver is divided by 6 and leaves a remainder of 3 (such as, the third stage 110(3) of the scan driver), the first clock signal CK45 applied to the stage 110(*n*) of the scan driver is implemented by a clock signal CK4. The second clock signal CK123 applied to the stage 110(*n*) of the scan driver is implemented by a clock signal CK3, and the third clock signal CK231 applied to the stage 110(*n*) of the scan driver is implemented by a clock signal CK1.

If the positive integer "n" about the n-th stage 110(*n*) of the scan driver is divided by 6 and leaves a remainder of 4, the first clock signal CK45 applied to the stage 110(*n*) of the scan driver is implemented by a clock signal CK5. The second clock signal CK123 applied to the stage 110(*n*) of the scan driver is implemented by a clock signal CK1, and the third clock signal CK231 applied to the stage 110(*n*) of the scan driver is implemented by a clock signal CK2.

If the positive integer "n" about the n-th stage 110(*n*) of the scan driver is divided by 6 and leaves a remainder of 5, the first clock signal CK45 applied to the stage 110(*n*) of the scan driver is implemented by a clock signal CK4. The second clock signal CK123 applied to the stage 110(*n*) of the scan driver is implemented by a clock signal CK2, and the third clock signal CK231 applied to the stage 110(*n*) of the scan driver is implemented by a clock signal CK3.

If the positive integer "n" about the n-th stage 110(*n*) of the scan driver is divided by 6 and leaves a remainder of 0, the first clock signal CK45 applied to the stage 110(*n*) of the scan driver is implemented by a clock signal CK5. The second clock signal CK123 applied to the stage 110(*n*) of the scan driver is implemented by a clock signal CK3, and the third clock signal CK231 applied to the stage 110(*n*) of the scan driver is implemented by a clock signal CK1.

As shown in FIG. 6 and FIG. 7, the first stage 110(1) of the scan driver outputs the clock signal CK4 as the scan signal S1(1) according to the start signal STV, and outputs the clock signal CK1 as the scan signal S2N(1). In some embodiments, the first stage 110(1) of the scan driver outputs the scan signals S1(1) and S2N(1) to the pixel circuit 120(1) arranged in a first pixel line of the pixel array and a second stage 110(2) of the scan driver.

The second stage 110(2) of the scan driver outputs the clock signal CK5 as the scan signal S1(2) according to the scan signal S2N(1) output by the first stage 110(1) of the scan driver, and outputs the clock signal CK2 as the scan signal S2N(2). In some embodiments, the second stage 110(2) of the scan driver outputs the scan signals S1(2) and S2N(2) to the pixel circuit 120(2) arranged in a second pixel line of the pixel array and a third stage 110(3) of the scan driver.

The third stage 110(3) of the scan driver outputs the clock signal CK4 as the scan signal S1(3) according to the scan signal S2N(2) output by the second stage 110(2) of the scan driver, and outputs the clock signal CK3 as the scan signal S2N(3). In some embodiments, the third stage 110(3) of the scan driver outputs the scan signals S1(3) and S2N(3) to the pixel circuit 120(3) arranged in a third pixel line of the pixel array and a fourth stage of the scan driver, and so on.

The sixth stage 110(6) of the scan driver outputs the clock signal CK5 as the scan signal S1(6) according to the scan signal output by the fifth stage of the scan driver, and outputs the clock signal CK3 as the scan signal S2N(6). In some embodiments, the sixth stage 110(6) of the scan driver outputs the scan signals S1(6) and S2N(6) to the pixel circuit 120(6) arranged in a sixth pixel line of the pixel array and a seventh stage of the scan driver.

Summary, the stage 110(*n*) of the scan driver of the display device 100 in the present disclosure can generate and output the scan signals S1(*n*) and S2N(n) having the enable voltages at different logic levels to the pixel circuit 120(*n*), so as to improve the leakage current in the pixel circuit 120(*n*). Furthermore, the stage 110(*n*) of the scan driver provided by the present disclosure can generate and output the scan signals S1(*n*) and S2N(n) having the different enable voltages by the fewer elements and the less circuit area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:

a pixel circuit; and a stage of a scan driver, electrically coupled to the pixel circuit, wherein the stage of the scan driver is configured to output a first scan signal and a second scan signal to the pixel circuit, wherein a first enable voltage of the first scan signal is at a first logic level, wherein a first disable voltage of the first scan signal is at a second logic level, and wherein a second enable voltage of the second scan signal is at the second logic level, wherein the stage of the scan driver outputs the first scan signal and the second scan signal according to a previous scan signal output by a previous stage of the scan driver, wherein a third enable voltage of the previous scan signal is at the second logic level, and wherein the second logic level is high logic level.

2. The display device of claim 1, wherein the stage of the scan driver comprises:

a first transistor, with a first terminal and a gate terminal configured to receive a previous scan signal, with a second terminal electrically coupled to an operating node;

a second transistor, with a first terminal configured to receive a first clock signal, with a second terminal configured to output the first scan signal, with a gate terminal electrically coupled to the operating node; and a third transistor, with a first terminal configured to receive a second clock signal, with a second terminal configured to output the second scan signal, with a gate terminal electrically coupled to the operating node, and wherein the first, the second and the third transistors are N-type transistors.

3. The display device of claim 2, wherein when the first transistor is turned on according to the previous scan signal and transmits the previous scan signal to the operating node, the second transistor is turned on to output the first clock signal as the first scan signal, and the third transistor is turned on to output the second clock signal as the second scan signal.

4. The display device of claim 2, wherein when the stage of the scan driver further comprises:

a first capacitor, with a first terminal electrically coupled to the operating node, with a second terminal electrically coupled to the second terminal of the third transistor.

5. The display device of claim 2, wherein when the stage of the scan driver further comprises:

a fourth transistor, with a first terminal and a gate terminal configured to receive a third clock signal, with a second terminal electrically coupled to a voltage stabilizing node;

a fifth transistor, with a first terminal electrically coupled to the operating node, with a second terminal electrically coupled to a system low voltage terminal, with a gate terminal electrically coupled to the voltage stabilizing node;

a sixth transistor, with a first terminal electrically coupled to the second terminal of the second transistor, with a second terminal electrically coupled to a system high voltage terminal, with a gate terminal electrically coupled to the voltage stabilizing node; and a seventh transistor, with a first terminal electrically coupled to the second terminal of the third transistor, with a second terminal electrically coupled to the system low voltage terminal, with a gate terminal electrically coupled to the voltage stabilizing node, wherein when the fourth transistor is turned on according to the third clock signal and transmits the third clock signal to the voltage stabilizing node, the sixth transistor is turned on to transmits a voltage at the system high voltage terminal to the second terminal of the second transistor, and the seventh transistor is turned on to transmits a voltage at the system low voltage terminal to the second terminal of the third transistor.

6. The display device of claim 5, wherein when the stage of the scan driver further comprises:

an eighth transistor, with a first terminal electrically coupled to the voltage stabilizing node, with a second terminal electrically coupled to the system low voltage terminal, with a gate terminal electrically coupled to the operating node; and a second capacitor, with a first terminal electrically coupled to the voltage stabilizing node, with a second terminal electrically coupled to the system low voltage terminal, wherein when the first transistor is turned on according to the previous scan signal and transmits the previous scan signal to the operating node, the eighth transistor is turned on to transmit the voltage at the system low voltage terminal to the voltage stabilizing node.

7. The display device of claim 1, wherein the pixel circuit comprises:

a driving transistor, with a first terminal electrically coupled to a first system voltage terminal;

a first N-type transistor, with a first terminal electrically coupled to a gate terminal of the driving transistor, with a second terminal electrically coupled to a second terminal of the driving transistor, with a gate terminal configured to receive the second scan signal; and a first P-type transistor, with a first terminal electrically coupled to a second terminal of the first N-type transistor, with a second terminal electrically coupled to a first reference voltage terminal, with a gate terminal configured to receive the first scan signal, wherein when the first scan signal has the first enable voltage, and the second scan signal has the second enable voltage, the first N-type transistor and the first P-type transistor are turned on, to reset the gate terminal of the driving transistor, and wherein when the first scan signal has the first disable voltage, and the second scan signal has the second enable voltage, the first P-type transistor is turned off and the first N-type transistor is turned on, to compensate a threshold voltage of the driving transistor.

8. The display device of claim 7, wherein the pixel circuit further comprises:

a second N-type transistor, with a first terminal configured to receive a data signal, with a gate terminal configured to receive the second scan signal;

a storage capacitor, with a first terminal electrically coupled to a second terminal of the second N-type transistor, with a second terminal electrically coupled to the gate terminal of the driving transistor;

a second P-type transistor, with a first terminal electrically coupled to a second reference voltage terminal, with a second terminal electrically coupled to the first terminal of the storage capacitor, with a gate terminal configured to receive an emission control signal;

a third P-type transistor, with a first terminal electrically coupled to the second terminal of the driving transistor, with a gate terminal configured to receive the emission control signal; and a light emitting element, with a first terminal electrically coupled to a second terminal of the third P-type transistor, with a second terminal electrically coupled a second system voltage terminal.

9. A display device, comprising:

a pixel circuit, comprising:

a first P-type transistor; and a first N-type transistor; and a stage of a scan driver, electrically coupled to the pixel circuit, wherein the stage of the scan driver is configured to:

output a first scan signal to a gate terminal of the first P-type transistor; and output a second scan signal to a gate terminal of the first N-type transistor, wherein a first enable voltage of the first scan signal is at a first logic level, wherein a first disable voltage of the first scan signal is at a second logic level, and wherein a second enable voltage of the second scan signal is at the second logic level, wherein the stage of the scan driver outputs the first scan signal and the second scan signal according to a previous scan signal output by a previous stage of the scan driver, wherein a third enable voltage of the previous scan signal is at the second logic level, and wherein the second logic level is high logic level.

10. The display device of claim 9, wherein the stage of the scan driver comprises:

a first transistor, with a first terminal and a gate terminal configured to receive a previous scan signal, with a second terminal electrically coupled to an operating node;

a second transistor, with a first terminal configured to receive a first clock signal, with a second terminal configured to output the first scan signal, with a gate terminal electrically coupled to the operating node; and a third transistor, with a first terminal configured to receive a second clock signal, with a second terminal configured to output the second scan signal, with a gate terminal electrically coupled to the operating node, and wherein the first, the second and the third transistors are N-type transistors.

11. The display device of claim 10, wherein when the first transistor is turned on according to the previous scan signal and transmits the previous scan signal to the operating node, the second transistor is turned on to output the first clock signal as the first scan signal, and the third transistor is turned on to output the second clock signal as the second scan signal.

12. The display device of claim 10, wherein when the stage of the scan driver further comprises:

a first capacitor, with a first terminal electrically coupled to the operating node, with a second terminal electrically coupled to the second terminal of the third transistor.

13. The display device of claim 10, wherein when the stage of the scan driver further comprises:

a fourth transistor, with a first terminal and a gate terminal configured to receive a third clock signal, with a second terminal electrically coupled to a voltage stabilizing node;

a fifth transistor, with a first terminal electrically coupled to the operating node, with a second terminal electrically coupled to a system low voltage terminal, with a gate terminal electrically coupled to the voltage stabilizing node;

a sixth transistor, with a first terminal electrically coupled to the second terminal of the second transistor, with a second terminal electrically coupled to a system high voltage terminal, with a gate terminal electrically coupled to the voltage stabilizing node; and a seventh transistor, with a first terminal electrically coupled to the second terminal of the third transistor, with a second terminal electrically coupled to the system low voltage terminal, with a gate terminal electrically coupled to the voltage stabilizing node.

14. The display device of claim 13, wherein when the fourth transistor is turned on according to the third clock signal and transmits the third clock signal to the voltage stabilizing node, the sixth transistor is turned on to transmits a voltage at the system high voltage terminal to the second terminal of the second transistor, and the seventh transistor is turned on to transmits a voltage at the system low voltage terminal to the second terminal of the third transistor.

15. The display device of claim 13, wherein when the stage of the scan driver further comprises:

an eighth transistor, with a first terminal electrically coupled to the voltage stabilizing node, with a second terminal electrically coupled to the system low voltage terminal, with a gate terminal electrically coupled to the operating node; and a second capacitor, with a first terminal electrically coupled to the voltage stabilizing node, with a second terminal electrically coupled to the system low voltage terminal.

16. The display device of claim 15, wherein when the first transistor is turned on according to the previous scan signal and transmits the previous scan signal to the operating node, the eighth transistor is turned on to transmit voltage at the system low voltage terminal to the voltage stabilizing node.

17. The display device of claim 9, wherein the pixel circuit further comprises a driving transistor, with a first terminal electrically coupled to a first system voltage terminal, wherein, the first N-type transistor comprises a first terminal electrically coupled to a gate terminal of the driving transistor, a second terminal electrically coupled to a second terminal of the driving transistor, and a gate terminal configured to receive the second scan signal; and the first P-type transistor comprises a first terminal electrically coupled to a second terminal of the first N-type transistor, a second terminal electrically coupled to a first reference voltage terminal, and a gate terminal configured to receive the first scan signal, wherein when the first scan signal has the first enable voltage, and the second scan signal has the second enable voltage, the first N-type transistor and the first P-type transistor are turned on, to reset the gate terminal of the driving transistor, and wherein when the first scan signal has the first disable voltage, and the second scan signal has the second enable voltage, the first P-type transistor is turned off and the first N-type transistor is turned on, to compensate a threshold voltage of the driving transistor.

18. The display device of claim 17, wherein the pixel circuit further comprises:

a second N-type transistor, with a first terminal configured to receive a data signal, with a gate terminal configured to receive the second scan signal;

a storage capacitor, with a first terminal electrically coupled to a second terminal of the second N-type transistor, with a second terminal electrically coupled to the gate terminal of the driving transistor;

a second P-type transistor, with a first terminal electrically coupled to a second reference voltage terminal, with a second terminal electrically coupled to the first terminal of the storage capacitor, with a gate terminal configured to receive an emission control signal;

a third P-type transistor, with a first terminal electrically coupled to the second terminal of the driving transistor, with a gate terminal configured to receive the emission control signal; and a light emitting element, with a first terminal electrically coupled to a second terminal of the third P-type transistor, with a second terminal electrically coupled a second system voltage terminal.

* * * * *